Oct. 21, 1952 D. W. SCOFIELD 2,614,483
TOASTING OR BROILING RACK
Filed June 10, 1950 2 SHEETS—SHEET 1

INVENTOR.
DONALD W. SCOFIELD
BY
Brown, Denk & Lynnestvedt
AGENTS

Oct. 21, 1952   D. W. SCOFIELD   2,614,483
TOASTING OR BROILING RACK
Filed June 10, 1950   2 SHEETS—SHEET 2
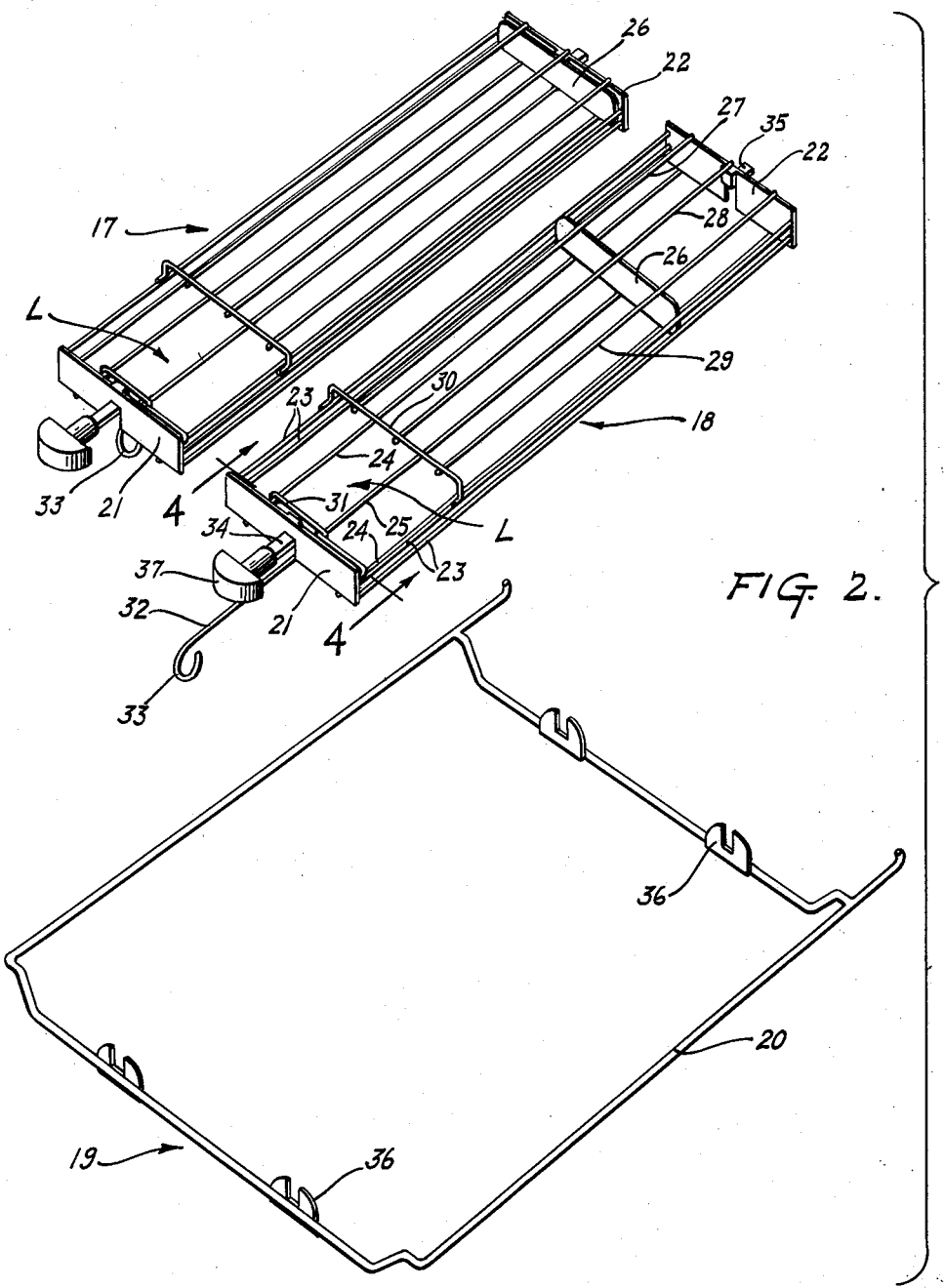
INVENTOR.
DONALD W. SCOFIELD
BY
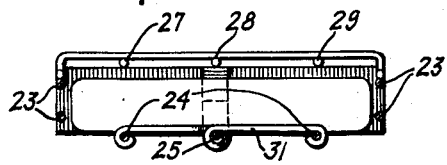
AGENTS Patented Oct. 21, 1952

2,614,483

UNITED STATES PATENT OFFICE 2,614,483

TOASTING OR BROILING RACK

Donald W. Scofield, Detroit, Mich., assignor to Philco Corporation, Philadelphia, Pa., a corporation of Pennsylvania Application June 10, 1950, Serial No. 167,347

2 Claims. (Cl. 99—393)

The invention hereinafter disclosed and claimed relates to culinary utensils and, more particularly, has reference to racks useful for toasting or broiling food.

While of broader applicability, the apparatus of the invention is of particular utility when employed in conjunction with the oven of a household cooking range, under which circumstances the broiler element of the oven may serve as the source of heat.

It is the primary object of my invention to provide a toasting or broiling rack, which is exceedingly simple to load, and which rack is of such a nature that—following the toasting or broiling operation—the prepared food may be readily and conveniently ejected therefrom.

The apparatus of the invention is further featured by the fact that it accommodates, simultaneously, a plurality of slices of bread or the like, and by the fact that it is possible to unload or eject hot, toasted bread without touching it with the fingers.

It is a further object of the present invention to provide a toasting or broiling rack, in novel combination with an oven including means removably supporting said rack therewithin with freedom for adjustment movements of the rack, without withdrawing the same from the oven. In this latter connection it is also a feature of the apparatus that means is provided to maintain the rack in proper position, in general parallelism with the oven broiling unit, while yet not interfering with the user's freedom to adjust or invert the rack in the oven.

To the foregoing general ends, the invention provides: a generally rectangular grille-like rack having a loading opening provided in one side thereof and so disposed as to be situated in the forward portion of an oven when the rack is in use; together with novel unloading means mounted for reciprocation within the rack and effective to eject toasted or broiled food through the aforesaid opening.

The manner in which the foregoing, together with other objects and constructional features of the invention, may best be achieved, will be fully understood from a consideration of the accompanying drawings, which illustrate a preferred embodiment of the invention.

In the drawings:

Figure 2 is an exploded, perspective view illustrating a pair of racks each of which embodies the invention, and also showing framing means through the agency of which said racks may be removably supported within an oven;

As stated above, the concepts of the invention are of particular utility when the device is employed, as a toaster, in conjunction with the oven of a household range and, accordingly, description of the apparatus will be directed to such use. It is to be understood, however, that invention also resides in the rack means, per se, and without limitation with respect to the type of cooking operation performed therewith.

Figure 1:
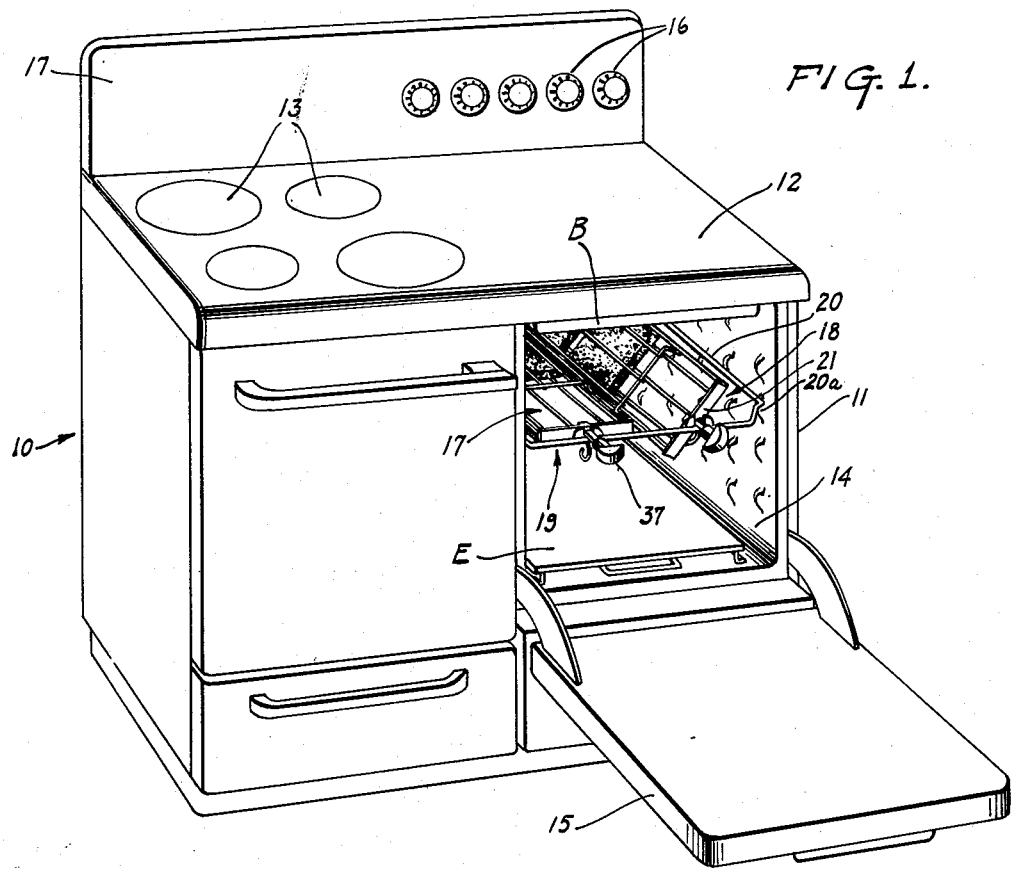
Figure 1 is a view, in perspective, illustrating a cooking range of the household type, and showing the rack means of the present invention in use therein.

Now making more detailed reference to the drawings, and initially to Figure 1 thereof, there is illustrated a cooking range designated, generally, by the reference numeral 10 and which range, for exemplary purposes, is shown as being of the electric type. As is customary, the range includes an outer shell 11, the upwardly presented surface 12 of which is provided with a number of surface units 13. Below surface 12 is an oven 14, having a forwardly presented access opening adapted to be closed by a door shown at 15. As is customary the oven includes, in addition to the heating element E used for baking purposes, a broiling element (shown at B) which is disposed closely adjacent to the top wall of the oven. The broiling element, as well as the aforesaid surface units, is controlled by suitable switch means 16, the operating members of which are mounted upon the front surface of a splashguard 17, of conventional type.

Disposed within the oven 14 is a pair of cage-like toasting or broiling racks constructed in accordance with the invention. These racks are identified by the reference numerals 17 and 18 and, as will appear more clearly in what follows, the racks are turnably supported within the oven, beneath the broiler element, through the agency of a supporting frame 19, side rails 20 of which are carried by supports 20a "bumped-out" from the oven liner. As will later appear, both loading and unloading of the racks may be readily and conveniently effected from the forward portion of the oven, this also being the case with respect to the rotational adjustments necessary to perform a cooking operation upon both sides of the food contained within said racks.

Figure 3:
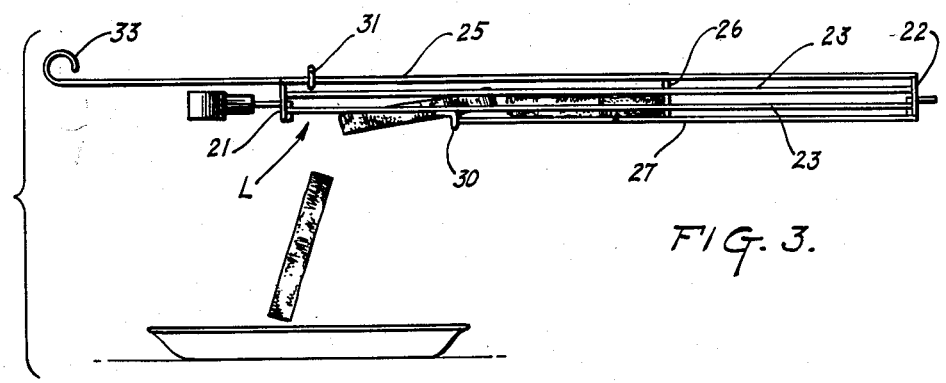
Figure 3 is a side elevational view of a rack of the type shown in Figures 1 and 2, and illustrative of the action of the ejecting mechanism; and, Figure 4 is a sectional view taken as indicated by the line 4—4, applied to Figure 2.

Turning now to Figures 2 to 4, it may be seen that each of the racks 17 and 18 comprises a cage defined by a pair of spaced end plates 21 and 22, and a plurality of grid members or rods extending between and being secured to said end plates. As appears to best advantage in Figure 4, each vertically extending side of the rack comprises a pair of rods 23—23 extending between the end plates, whereas the lower wall of each rack (as the racks are viewed in Figure 2) is defined by a pair of similar rods 24. Intermediate the rods 24 is a longitudinally reciprocable rod 25. To this rod is secured an ejector member or plate 26, which latter is operable in a manner fully set forth later in this description. Three rods, identified at 27, 28 and 29, enclose the top of the rack, that is, these rods define the wall which is presented upwardly when the rack is in the position illustrated in Figure 2.

In particular accordance with this invention, the three rods last mentioned terminate short of the end plate 21, thus providing an opening through which bread, for example may be loaded and ejected. This opening, represented at L in the drawings, is defined by that edge of the end plate 21 which is upwardly presented during the loading operation, by the pairs of side rods 23—23, and by a cross wire 30 which supports the forward ends of top rods 27, 28 and 29. Means, for example the wire shown at 31, engages the forward ends of lower rods 24—24, an intermediate looped portion of said wire providing for retention of a hand-manipulable portion 32 of reciprocable rod 25, which latter portion extends outwardly of the rack. This extended portion 32, in turn, has its outer end looped to provide a finger piece 33 through the agency of which rod 25 may be reciprocated, thus moving the ejector plate 26 between extended and retracted positions with respect to the end plate 22.

As is clearly shown in Figure 2, each rack has short studs, 34 and 35, extending outwardly from the central portion of end plates 21 and 22, respectively. The studs are rectangular in cross section and are adapted to be removably received within correspondingly configured seats 36 carried by the member or frame which supports the racks within the oven 14. This rectangular configuration insures that, whereas the racks may be readily rotated in the supports 36 through the agency of handle means shown at 37, said racks will remain in either of two positions, selectively. Thus the racks are turnably mounted and may be releasably retained in one position, in which the loading opening L is upwardly presented, and in another position in which said loading opening is downwardly presented (see Figure 3).

When the apparatus is to be used, the finger piece 33 is moved inwardly until the ejector plate 26 occupies its fully retracted position, and the rack is also so adjusted in its supports 36 that the loading opening is presented upwardly. When thus adjusted, bread may be introduced through the said opening—which is readily accessible from the front of the oven—and slid backwardly within the rack. If desired, of course, the rack may be loaded prior to its introduction within the oven.

In the embodiment illustrated, three pieces of bread may be accommodated in the rack rearwardly of the loading opening. After the upwardly presented side of the bread has been toasted, the broiler being energized, the rack is turned through 180° and the toasting operation is completed. The hot toast may be readily and conveniently ejected, for example into a suitable receptacle supported within the lower portion of the oven, by drawing the finger piece 33 forwardly. The unloading operation is clearly illustrated in Figure 3, from which figure it will be understood that the bread is moved forwardly by the ejector plate 26 and the pieces dropped, sequentially, through the opening L, which is then downwardly presented. As will now be appreciated, both loading and unloading are accomplished by moving the food through the opening in a direction transverse to the longitudinal axis of the rack. Thus rotation of the rack until the opening faces down, and drawing of the food to the opening, automatically conditions the apparatus for ejection of the food under the influence of the force of gravity. Inversion of the rack and rearward movement of the ejector plate 26 is all that is required to condition the device for another toasting operation.

From the foregoing description it will be understood that the present invention provides a novel toasting or broiling implement which makes it possible to utilize the oven of a kitchen range in the simplest possible manner in the simultaneous preparation of a number of slices of bread, or other pieces of food to be exposed to the heat of the oven broiler unit. As indicated hereinabove, the apparatus is particularly characterized by the ease with which food may be introduced within and ejected from the rack, and it is to be noted that removal of the rack from the oven is not required, in order to gain access to the interior thereof.

While a preferred embodiment of my invention has been illustrated in the accompanying drawings and described in this specification, it will be evident that the invention is susceptible of changes and modifications, without departing from the essential spirit thereof. For example, while the rack as shown comprises a cage of openwork, insofar as the principles of the invention are concerned, this cage could take other forms in which a useful cooking operation could be performed, and the term "cage" is therefore to be understood as having a broad connotation. It will be understood, however, that such changes and modifications are contemplated, as may come within the terms of the appended claims.

I claim:

1. Food toasting or broiling apparatus comprising, in combination, a toasting or broiling compartment including a forwardly disposed access opening and a source of heat, an elongated generally rectangular cage having shaft means extending from opposite end portions thereof, said cage being configured to receive food to be toasted or broiled and having an opening in one side thereof through which the food may be introduced within and removed from said cage, the opening in said cage being disposed in substantial adjacency to said compartment access opening, means including support structure carried by wall portions of said compartment and having seating means cooperable with said shaft means removably to mount said cage within said compartment with freedom for rotative movements about said shaft means between a position in which one side of said cage confronts said heat source and said cage opening is upwardly presented, and a position in which the other side thereof confronts said heat source and said cage opening is downwardly presented, and ejector means disposed within said cage and engageable with food therein to provide for removal of the food from the cage without removing the cage from said compartment, said ejector means being movable to bring the food into registry with said cage opening whereby, when said cage opening is downwardly presented, gravitational force acting upon the food is effective to cause it to drop through said cage opening into position to be removed through said access opening.

2. Apparatus in accordance with claim 1, and further including handle means accessible through said compartment access opening and by means of which the stated movement of said ejector means may be effected.

DONALD W. SCOFIELD.

REFERENCES CITED

The following references are of record in the file of this patent:

UNITED STATES PATENTS

| Number | Name | Date |
|---|---|---|
| 943,593 | Dresdner | Dec. 14, 1909 |
| 2,161,512 | Haislip | June 6, 1939 |
| 2,297,825 | Bobo | Oct. 6, 1942 |
| 2,487,651 | Gudmundsen | Nov. 8, 1949 |
| 2,504,445 | Pavnica | Apr. 18, 1950 |